United States Patent Office 2,754,215
Patented July 10, 1956

2,754,215

METHOD OF STABILIZING THE FLAVOR OF ESSENTIAL OILS AND THE RESULTING COMPOSITION

James W. Evans, Highland, Ind., and Albert W. Kleinschmidt, Crete, Ill., assignors to American Maize-Products Company, a corporation of Maine No Drawing. Application October 4, 1952,
Serial No. 313,196

8 Claims. (Cl. 99—140)

This invention relates to the manufacture of stabilized essential flavoring oils for use in packaged food products of the type which are instantly prepared merely by the addition of cold water or milk. To be satisfactory for this type of product, the flavoring agent must be stable against oxidation, hydrolytic and polymeric change and it must readily disperse in the cold water or milk used for preparing the packaged food.

One of the recognized methods of adding essential flavoring oils to packaged food products is to spray the oil over the dry food mix before it is packaged. In this way the food particles are given a surface coating. However, the method is not entirely satisfactory because the oil soon develops a disagreeable taste which prevents storing the packaged goods for any appreciable period of time. Such change in flavor is believed to be associated with oxidation of unstable aldehydes and olefins and polymerization of terpenes of the oil in the presence of air, acid and water.

We have now discovered that oils which have been emulsified with an edible non-aqueous yet water-soluble material and in the presence of a proteinaceous material such as non-fat milk solids maintain full flavor without change even after long periods of storage. The protein apparently forms a continuous film or capsule around each drop of oil and it may well be that this film is impervious to air and water so that there is no chance for chemical change. Or it may be that the acidic and basic (amphoteric) characteristics of the protein in some way inhibit the chemical change which normally occurs when the oil is exposed to air and water. In any event, it is a fact that packaged food products made with our improved flavoring material have been stored for many months without loss of flavor or development of a disagreeable taste. Another outstanding characteristic of our flavoring material is that the resulting capsules readily disperse in cold water or milk and as a result the flavor is quickly released throughout the liquid. This is particularly desirable for instant desserts which are prepared merely by the addition of cold water or milk.

While any flavoring material may be used in our process it is especially valuable with those which are highly volatile or undergo chemical change in the presence of air, water and acids. The flavor may be a natural product such as oil of lemon, orange, lime or a synthetic flavor as oil of wintergreen, ethyl acetate, ethyl maleate, etc.

As to the many available proteins which may be used for coating the essential oils, for our purpose we prefer proteins such as the ones found in non-fat milk solids and soya flour. By the term non-fat milk solids we mean the solids which remain after the water and fatty constituents have been substantially removed from milk. It is to be noted that a non-aqueous system is employed in forming the protective protein film around droplets of essential flavoring oils and it follows from this that the protein we use is, of course, in non-aqueous state. As to the non-aqueous, continuous phase of our emulsion, we have achieved excellent results with glycerine and propylene glycol. However, we do not intend to limit ourselves to these materials and any edible non-aqueous, water-soluble material which can serve as the continuous phase of an emulsion stabilized by proteins may be used.

In the practice of our invention we prefer to mix the proteinaceous material in the carrier and then add the essential oil drop by drop while stirring the mixture vigorously. When this is done the protein quickly forms a film around the individual drops of oil to give an exceptionally stable emulsion. Any question as to how long the mixture must be agitated is readily settled by examination of a few drops of the material under a microscope which clearly shows the extent to which the emulsion has formed. Once the time required to form an emulsion has been determined for a particular mixture, subsequent batches may be agitated for the same period of time to achieve the same result.

The amount of protein used is not critical for our purpose but of course enough must be used to completely coat the drops of oil. We have successfully used as little as 4 parts of protein for 100 parts of essential oil calculated on a weight basis. Although our result is achieved without commercial emulsifying agents if desired they may be added provided they do not adversely affect the physical or chemical characteristics of the essential oil, the protein or continuous phase material.

After the emulsion has been formed it may be blended directly into the dry food mix with conventional mixing or blending equipment or the emulsion may first be mixed with an edible carbohydrate material and then blended with the dry food mix.

For the purpose of illustration and in order to point out the best method now known to us of carrying out our invention the following specific examples are given:

*Example 1*

30 grams of dry non-fat milk solids were agitated in 200 grams of glycerine until the milk solids appeared to be uniformly dispersed in the glycerine. Agitation was continued while 106 grams of lemon oil were added drop by drop. 0.0273 part by weight of the mixture was then blended with 135 parts by weight of a dry food mix containing essentially of sugar and precooked starch. The product was packaged and stored at room temperature. More than a year later the product was found to have excellent lemon flavor and pleasing aroma.

*Example 2*

The method of Example 1 was repeated with the following ingredients:

| | Grams |
|---|---|
| Lemon oil | 106 |
| Non-fat milk solids | 30 |
| Glycerine | 200 |
| Span No. 20 | 1 |
| Tween No. 20 | 1 |

.0273 part by weight of the mixture was used in a dry food mix which was stored as specified in Example 1 with the same results. This example illustrates the use of commercial emulsifying agents which are readily available on the open market. Spans constitute a series of long chain fatty acid partial ester of hexitol anhydrides. The hexitol anhydrides include sorbitans and sorbides, mannitans and mannides. Tweens comprise a series of polyoxyalkylene derivatives of hexitol anhydride partial long chain fatty acid esters.

Example 3

The method of Examples 1 and 2 were repeated except that soya flour was used in place of the non-fat milk solids.

Example 4

The method of Examples 1 and 2 was repeated except that propylene glycol was used in place of glycerine.

Although the examples are directed to instant type lemon pie filling, it will be clearly understood that other flavoring materials and other dry food products whether of the instant or conventional type may be used.

It will be further understood that the examples are merely intended to give specific illustrations of the way that our invention can be carried out and are not intended to imply any limitations on the variations that may be employed.

What we claim is:

1. The method of stabilizing the flavor of volatile essential oils for use in dry food products which comprises emulsifying an essential oil in a mixture consisting essentially of an edible non-aqueous water soluble liquid carrier and in the presence of an edible non-aqueous protein whereby oxidation of reactive aldehydes and terpene polymerization is prevented in storage.

2. The method of claim 1 which includes the step of blending the resulting emulsion with an edible hygroscopic carbohydrate.

3. The method of claim 2 in which the edible hygroscopic carbohydrate comprises an admixture of sugar and precooked starch.

4. The method of claim 1 which includes the step of adding an emulsifying agent to the mixture.

5. A volatile essential oil encapsulated in a film of non-aqueous edible protein selected from the group consisting of non-fat milk solids and soya flour which stabilizes the flavor and prevents oxidation of reactive aldehydes and terpene polymerization during storage.

6. A composition of matter for use in dry food products consisting essentially of an edible emulsion of a volatile essential oil in a non-aqueous water soluble liquid carrier containing an edible protein material in which the individual drops of oil are coated with a film of the edible protein to stabilize the flavor and prevent oxidation of reactive aldehydes and terpene polymerization during storage.

7. A composition of matter as specified in claim 6 which includes an emulsifying agent.

8. The method of stabilizing the flavor of volatile essential oils for use in dry food products which comprises the steps of dispersing an edible protein in an edible non-aqueous water-soluble liquid carrier, adding an essential oil drop by drop while maintaining the mixture under vigorous agitation to form a protective coating of protein around the individual drops of essential oil and prevent oxidation of reactive aldehydes and terpene polymerization during storage.

References Cited in the file of this patent

UNITED STATES PATENTS

| Number | Name | Date |
|---|---|---|
| 1,545,993 | Alsberg | July 14, 1925 |
| 1,971,910 | Griffith | Aug. 28, 1934 |
| 2,088,622 | Stokes et al. | Aug. 3, 1937 |
| 2,369,847 | Olsen et al. | Feb. 20, 1945 |
| 2,561,797 | Huntsinger | July 24, 1951 |